Dec. 26, 1939.  W. MORETTI  2,184,394
CLUTCH MECHANISM
Filed Sept. 20, 1937    3 Sheets—Sheet 1
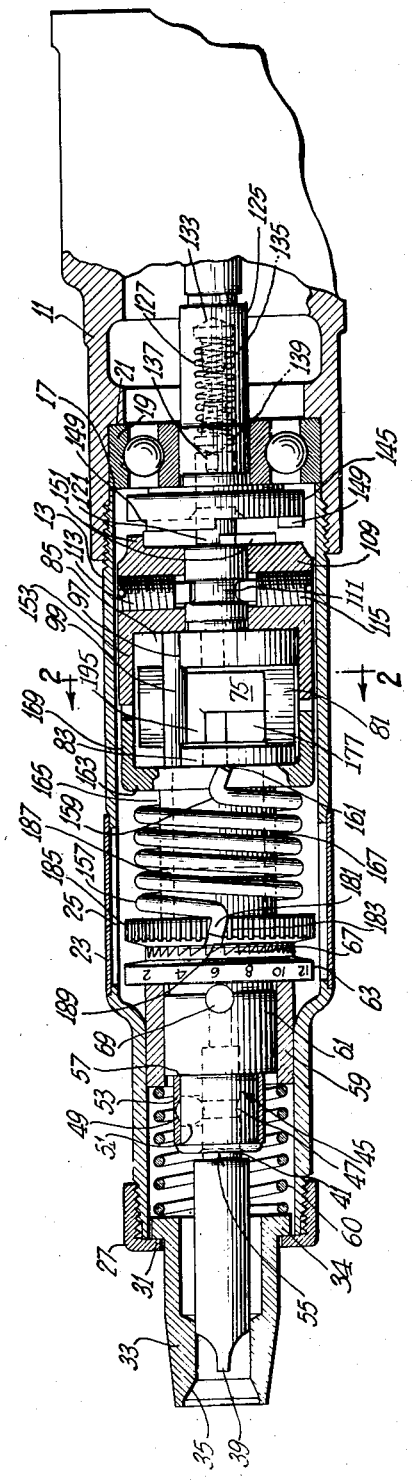
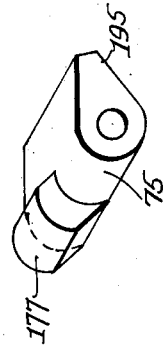
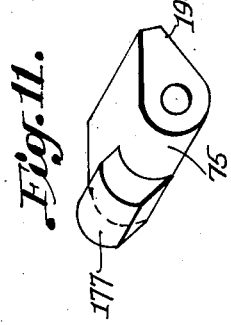
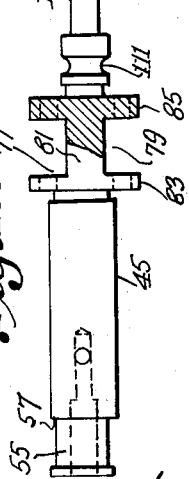
INVENTOR
Whitfield Moretti
BY Frederic P. Woofield
ATTORNEY

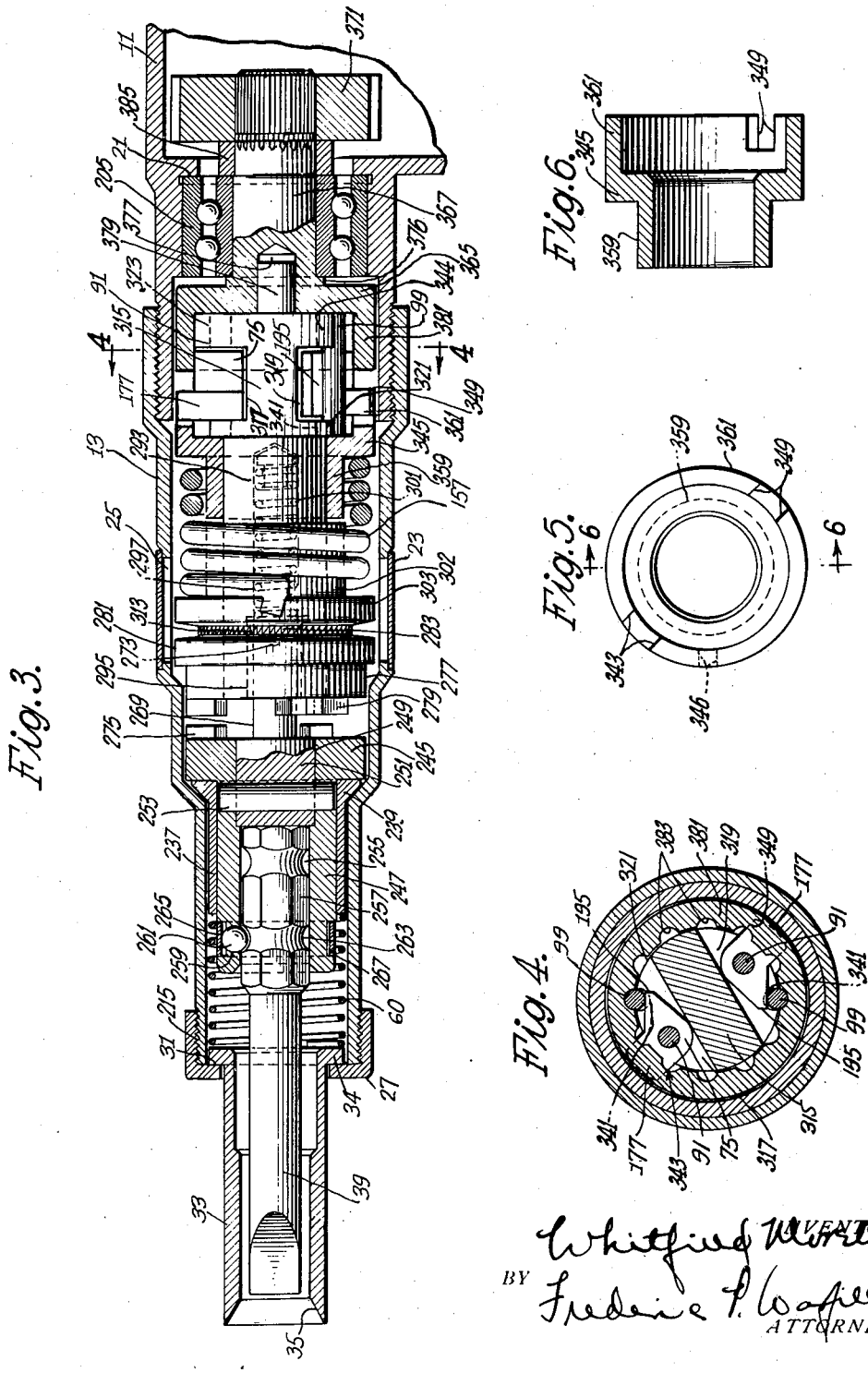

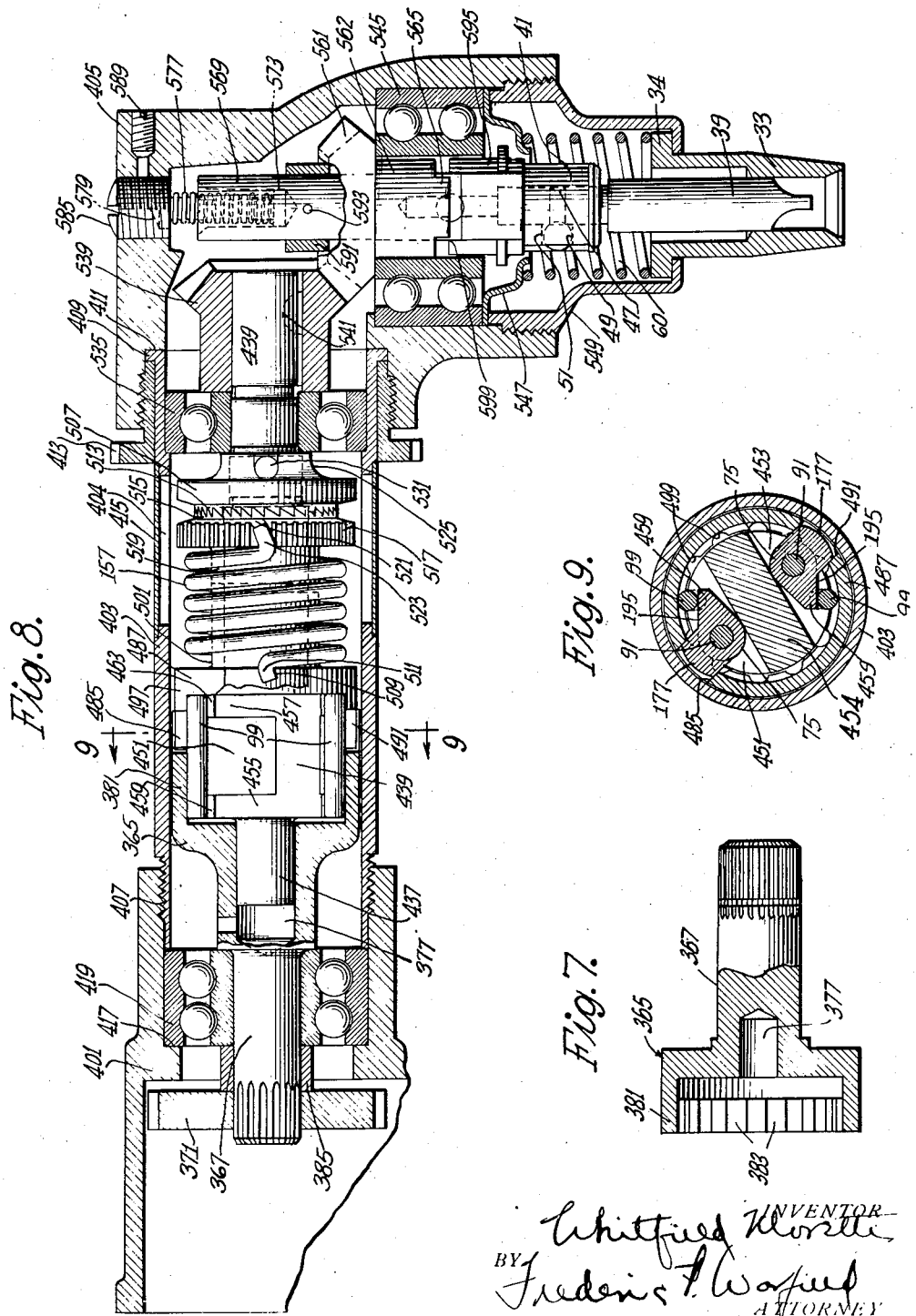

Patented Dec. 26, 1939

2,184,394

UNITED STATES PATENT OFFICE 2,184,394

CLUTCH MECHANISM

Whitfield Moretti, Millers Falls, Mass., assignor to Millers Falls Company, Greenfield, Mass., a corporation of Massachusetts Application September 20, 1937, Serial No. 164,685

9 Claims. (Cl. 192—30.5)

In power-driven rotary tools it is of importance that the rotation of the tool-working member be halted and the operating parts be relieved from strain whenever the working member is restrained against movement, as is the case when a screw is fully driven, a nut is fully set, or when unexpected obstruction prevents the screwing or unscrewing of a nut or screw, when the operation of the drill is halted by encountering an obstruction, or when, for any of a variety of causes, the normal turning movement of the working member of such a tool is hindered; and it is of importance that the means provided for this purpose be of as permanent and rugged construction as possible, and that wear on the various parts be minimized. It is also of importance that the tool be arranged to operate satisfactorily, regardless of the rotation of the working member. Even though conditions requiring the presence of such means may be encountered only occasionally, it readily will be apparent that the failure of such a means to function in both directions might readily result in expensive, or at least annoying, consequences, as well as in unnecessary strain on the operating parts.

An object of the present invention is to provide a rotary power-driven hand tool which includes improved means of simplified construction for releasing operating parts including the working member for rotation upon the application of a predetermined amount of strain or force thereon, so that the operation of the said parts will be interrupted during the duration of the application of such force, thereby relieving the tool from likelihood of injury arising from such force.

A further object of the invention comprises the provision of improved clutch mechanism in a tool of the above-indicated character, which mechanism transmits rotary motion from a driving spindle to a driven spindle, by means of which improvements the wear on the clutch members is minimized.

A still further object of the invention comprises providing a tool of the above-indicated character which comprises improved instrumentalities for controlling and releasing torque on the operating parts, which instrumentalities may be applied in various locations relative to the clutch mechanism and which may be adapted with equal ease and efficiency to tools of the above-indicated character wherein the operating parts may be disposed either on a straight line axis, or in angular relation.

A still further object of the invention is to provide a rotary power-driven hand-tool which is simple and sturdy in construction, which has a long life, which can be readily and economically manufactured and assembled, and which will efficiently accomplish the purposes for which it is intended.

Further objects and advantages of the present invention will become apparent as the description proceeds, and the features of novelty will be pointed out in particularity in the appended claims; and the invention accordingly comprises the features of construction, combination of elements, and arrangement of parts which will be exemplified in the construction hereinafter set forth and the scope of the application of which will be indicated in the claims.

For a fuller understanding of the nature and objects of the invention, reference may be had to the following detailed description, taken in connection with the accompanying drawings, in which:

Fig. 1 is a longitudinal sectional elevation of a rotary power-driven hand-tool illustrating screw or bolt driving mechanism including the clutch construction and torque-relieving instrumentalities of the present invention, the source of power being omitted;

Fig. 2 is a transverse sectional elevation of the tool taken on the line 2—2 of Fig. 1 looking in the direction of the arrows;

Fig. 3 is a view similar to Fig. 1, but showing a modified form of construction, wherein the adjustable clutch is directly connected or integral with the driving shaft;

Fig. 4 is a transverse section, taken on the line 4—4 of Fig. 3, looking in the direction of the arrows;

Fig. 5 is a detail view of an end of one of the clutch collars shown in the mechanism illustrated in Figs. 3 and 4;

Fig. 6 is a sectional elevation on the line 6—6 of Fig. 5, looking in the direction of the arrows;

Fig. 7 is a longitudinal sectional elevation of another clutch collar shown in the mechanism illustrated in Figs. 3 and 4;

Fig. 8 is a view showing a longitudinal sectional elevation of a further modified form of mechanism, wherein the drive for the bit and clutch is disposed angularly relatively to the torsion control mechanism and the driving means;

Fig. 9 is a transverse section taken on the line 9—9 of Fig. 8, looking in the direction of the arrows;

Fig. 10 is an elevation, partly broken away, of the main spindle of the tool shown in Fig. 1; and Fig. 11 is a detailed view in perspective of one of the pawl members.

Referring more particularly to the drawings, and first to Figs. 1 and 2 of the exemplified embodiment of the invention, the portable power-operated screw-driving and nut-setting machine comprises a main housing 11 which may contain the source of power, not shown, for driving a spindle in which the working member is mounted, the housing 11 being shown as being threadedly interconnected with a tubular cylindrical casing 13. As will be seen from the drawings, the thickness of the housing 11 adjacent to this joint is less than it is towards its forward end so that the end 17 of the casing 13 cooperates with the annular shoulder 21 of the housing 11 to form an annular recess for receiving the ball-bearing 19, this being held in place between the end 17 and shoulder 21.

The casing 13 houses the driven spindle mechanism and a control clutch therefor, and is constricted towards the bit-holding end, for reasons to be hereinafter apparent; and at a suitable position forward of the constricted portion, the housing 13 is provided with an opening 25 providing access to the interior of the casing, there being a cover 23 provided for closing this opening 25.

A collar 27 is threaded over the forward end of casing 13 and is provided with an inturned flange 31, defining a retaining flange for a sleeve 33 in conjunction with flange 34, which sleeve forms the finder for a screw or bolt head to be set by the tool. The sleeve 33 encloses a bit 39. The rearward end or shank of this bit 39 is turned down as indicated at 41 to form a shaft end for the bit that is received in an axially extending recess in spindle 45 indicated in Figs. 1 and 10 by dotted lines; the shaft end 41 of the bit 39 being provided with a groove 47 which receives a locking ball 49, this ball 49 being received in a suitable recess 51 provided in the end section of the spindle 45 and held in the groove 47 by means of a locking ring 53 retained between an end collar 55 and a shoulder 57 on the spindle 45, the spindle being centered in the casing by means of an annular bushing 59. Between bushing 59 and sleeve 33 is mounted a compression spring 60.

This bushing 59 receives an annular extension 61 on a stop collar 63, the extension 61 forming a bearing that rotates in the bushing 59, the bearing 61 being attached to spindle 45 by means of a pin 69. The stop collar 63 is provided with clutch teeth 67, the purpose of which will become apparent hereinafter.

Passing now to the construction of the torque-relieving instrumentalities, it will be seen that the spindle 45 is enlarged as shown in Fig. 10 to provide a housing or hub in which are mounted the said torque-relieving clutch instrumentalities. These instrumentalities comprise a pair of pawls 75 which are located in grooves 77 and 79 provided in the housing, these grooves being bounded by a central rib 81 of spindle 45 between the grooves and by flanges 83 and 85 as shown in Fig. 10, these flanges having journaled therein fulcrum pins 91 upon which pins are mounted the pawls 75. Also, the flanges 83 and 85 are provided with additional grooves 95 and 97 serving as guides for clutch pins 99.

Towards the rearward end of the spindle 45, there is provided a shoulder upon which is located a clutch collar 109, which collar is held in position by a groove 111 in the spindle 45, the groove 111 receiving set screws 113 and 115 provided with suitable ends which enter the groove 111 and laterally hold the clutch collar 109 while allowing it to rotate on the spindle.

In order to support the spindle 45, its diameter is decreased adjacent to its rearward end, as indicated at 121, so that its rearward end may be received in the drive shaft 125, which is provided with an axially extending recess 127 forming the support for the spindle-end 121.

The inner end of the recess 127 forms a shoulder against which a spring-guide pin 133 is held by a compression spring 135, the end 121 of the spindle 45 being provided with a recess 137 forming a seat for a spring guide pin 139. The pins 133 and 139 are extended to form guides for the spring 135.

The drive shaft 125 carries a clutch element 145 which rests against the inner race of the ball bearing 19, clutch teeth 149 being provided on the clutch member 145, which teeth are adapted to interengage with similar clutch teeth 151 on the clutch collar 109, this collar 109 being provided with an annular extension 153, which is provided on its inner surface with lateral grooves 155 (see Fig. 2) for receiving the clutch pins 99.

A collar 165 fits over spindle 45 and has a flange 163 which encloses the end flange 83. The flange 163 is provided with a groove 161 which receives one end 159 of a torsion spring 157, the other end of which, indicated at 181 is mounted as will be described hereinafter.

The collar 165 is extended at 167 to clear the spring 157, and flange 163 of collar 165 is extended into an annular collar 169, provided with grooves 173 and 175 (Fig. 2) into which are fitted the ends 177 of the pawls 75.

Adjacent to the stop collar 63 is a ratchet collar comprising a flange 185 formed on a collar 187 which is mounted on the spindle 45. The flange 185 is provided with a groove 183 which receives the end 181 of the torsion spring 157, and the flange 185 is provided also with clutch teeth 189 which are adapted to engage with the clutch teeth 67 of the stop collar 63, the surface of the flange 185 being grooved so that various predetermined settings of the clutch teeth 67 and 189 may be made for varying the amount of torsion on the torsion spring 157.

From Figs. 2 and 11 it will be seen that the pawls 75 are shaped as bell-cranks with one end formed for lifting the clutch pins 99.

From the above description of the parts, it will be seen that when the working bit 39 is fitted into the slot of a screw-head, pressure exerted by the operator causes the spindle 45 to be shifted back into the tool casing and to compress spring 135 at the driving end of the mechanism until the clutch teeth 149 and 151 come into mesh. Since the clutch member 145 is continuously rotating from the driving motor, this meshing of the clutch teeth causes the clutch collar 109 to rotate, thereby rotating the spindle 45 and bit 39. Now, if there were no torsional strain built up in torsion spring 157, there would be no force to hold the clutch pins 99 in the grooves 155, so that accordingly the clutch pins would be forced out of these grooves by rotation of the clutch collar 109, the clutch pins falling into grooves 95, 97, the extension 153 of the clutch collar 109 then rotating freely over the pins 99.

However, when predetermined torsion is applied to the spring 157 by suitable adjustment of the ratchet collar 185, the resulting force is transmitted through the spring to the flange 163, tending to turn the latter which causes the pawls 75 to pivot on the fulcrum pins 91 to force the ends 195 of the pawls against the clutch pins 99 so as to force the said pins into grooves 155, and to hold the said pins 99 in this position, thereby overcoming any tendency of the clutch pins to slip out of these grooves, the clutch pins thereby, for all purposes, uniting the clutch collar 153 and spindle 45 as a solid shaft and the entire mechanism in the housing is driven as though it were a unitary mechanism; and the amount of torsion applied to the spring 157 may be adjusted as desired by effecting corresponding adjustment of the ratchet collar 185, it being understood that the greater the amount of this torsion, the more firmly will the clutch pins 99 be held in the said grooves; but when the bit 39 completes the screw-driving operation, or if it or any other working part encounters an obstruction during service, continued rotation of the clutch collar 109 will act on the clutch pins 99 to force them out of the said slots in opposition to the spring torsion and against the force applied by pawls 75, causing these pawls to turn in the opposite direction on the fulcrum pins 91 to allow the clutch pins 99 to drop into grooves 95, 97, thereby breaking the connection between the collar 153 and spindle 45, thereby eliminating likelihood of damage to any of the parts because of such obstruction; and when the work is driven home, the rotation of the clutch collar 109 and its collar extension 153 over the released clutch pins causes the tool to deliver successive impacts to the work, tending to tighten the work further.

Figs. 3 and 4 show a modified construction in which the internally serrated or grooved clutch is directly connected or integral with the driving shaft, although the construction shown in these views is similar in principle to the construction shown in Figs. 1 and 2.

In Figs. 3 and 4, a main housing 11 houses the source of power, not shown, and it is provided with an internal annular shoulder 21 which forms an abutment for ball-bearing 205.

The main housing 11 is threaded adjacent to its end to provide the connection for receiving the tubular extension casing 13, the forward end 215 of which is threaded for receiving the assembly of the end cap 27, the casing 13 being constricted towards the end 215.

The chuck assembly is similar to that shown in Fig. 1, but the bit holding unit is somewhat modified. The bushing 237 is provided with a tapered end flange 239 for properly locating the bushing in the casing, the bushing 237 also serving as a thrust-bearing for a clutch collar 245 which is provided with a hub 247 which fits into bushing 237. The clutch collar 245 is drilled out at 249 to receive a clutch guide shaft 251 which is secured to hub 247 by a pin 253.

The clutch hub 247 is provided with a hexagonal socket hole 255 which receives similarly shaped shank 257 of bit 39, and the hub 247 is provided also with a lateral hole 259 for receiving a lock ball 261, which fits into a groove 263 in the shank 257 and which is held in place by a ring 265, which seats in a groove 267 in the clutch collar hub 247.

The clutch guide shaft 251 is extended at 269 and is provided at its end with a recess for receiving a spring thrust plug 273, which construction will be referred to in greater detail hereinafter.

Clutch collar 245 is provided with clutch teeth 275 which are adapted to engage with corresponding teeth 279 on a clutch collar 277 for driving the bit 39. The clutch collar 277 has a flange 281 which carries ratchet teeth 283. This collar 277 is apertured suitably to receive one end of spindle 293, a suitable bushing 295 being provided in the shaft 293 to support same on pilot 269. A recess 297 is provided in the end of spindle 293, the end of this recess forming a support for a spring thrust plug 299, a compression spring 301 being supported on the hubs of spring thrust plugs 273 and 299, this spring acting to maintain the clutch collars 245 and 295 disengaged.

The torsion adjusting collar 302 is provided with a flange 303, in which is located a slot which forms an anchorage for one end of torsion spring 157. Collar 302 clears the torsion spring 157 and rotates on shaft 293. Ratchet teeth 313, that mesh with ratchet teeth 283, are provided on torsion-adjusting collar 302.

Spindle 293 is enlarged at 315, and grooves 317 and 319 are provided in the enlarged hub 315 (see Fig. 4) forming flanges 321 and 323 in which flanges are drilled suitable holes, not shown, for receiving pawl-fulcrum pins 91, upon which pins the pawls 75 are fulcrumed, these pawls being located in grooves 317 and 319, bounded by rib 315, this construction being exactly the same as that shown in Figs. 1 and 2.

Arms 177 of pawls 75 engage slots 343 and 249 in collar 345. Arms 195 of pawls 75 support clutch pins 99, as in Figs. 1 and 2. Slots 341 are provided in flange 321 of spindle 293 and slots 344 are provided in flange 323 of spindle 293 to form end guides and supports for clutch pins 99, these slots corresponding to slots 95 and 97 in Figs. 1 and 2.

The collar 345 is similar to collar 165 and is provided with a hub 359 fitting within the torsion spring 157 and turning on shaft 293, the collar 345 having a slot 346 therein, for receiving the end, not shown, of torsion spring 157, this arrangement being generally similar to that shown in Figs. 1 and 2. Also, the collar 345 is provided with an annular extension 361, provided with slots 343 and 349 to engage extensions 177 of pawls 75.

A collar 365 is provided with a hub 367 which fits in the annular opening in the inner race of ball bearing 205, the hub 367 being extended into a driving shaft to receive the driving gear 371, which is securely mounted thereon by means of a keyed or milled connection as shown at 373.

A shoulder 376 is provided on collar 365, which shoulder abuts against the end of the inner race of the ball bearing 205, and collar 365 is recessed as indicated at 377 for receiving the extension 379 of spindle 293, the collar 365 having also a ring extension 381 provided with lateral grooves 383 for receiving pins 99.

A spacer collar 385 is placed between the gear 371 and the ball bearing 205.

The operation of this mechanism should be obvious from the above description with reference to Figs. 1 and 2.

To make the bit 39 rotate, the head of the screw is set in the end 35 of sleeve 33. Pressure against the screw is then exerted by the operator, causing sleeve 33 to press against the spring 60, thereby causing bit 39 to be inserted in the slot in the head of the screw. Pressure against the screw is then exerted by the operator, compresses spring 301 and causes the clutch teeth 275 to engage clutch teeth 279. This action causes the bit 39 to turn, thereby driving the screw in place.

Now, if the safety collar were not provided in its proper location, then the action would be that of a solid shaft turning the bit 229, such shaft being rotated by a source of power that would be in excess of the amount of energy required to turn the screw and set it in place. This action would result in the breakage of the screw head by the bit 39, or in the bit slipping out of the screw slot.

When the torsional stress becomes greater than the force set up for holding pins 99 in grooves 383, only the collar 365 will rotate because the pins 99 will be forced out of their grooves, and into the next groove, this continuing until the operator lifts the bit 39 out of the slot in the screw; then spring 301 disengages the clutch 275, thereby releasing the torsional load and allowing the safety collar mechanism to rotate as a unit.

Referring now to the modification of the construction shown in Figs. 8 and 9, the construction of which modification is very similar in principle to the previously described modification, it will be seen that the mechanism comprises two housings 401 and 405, the housing 401 containing the source of power for operating the screw bit, while housing 405 encloses and supports the bevel gears, ball bearings and shafts as will be described in detail hereinafter, for transmitting the rotary motion of the shafts at right angles for driving the bit.

The housings 401 and 405 are connected by a tubular housing 403 which is connected at one end to housing 401 by means of a threaded joint 407, the other end of the housing 403 being provided with a flange 409 which abuts against seat 411 of housing 405, a clamp bushing 413 holding housing 403 in the housing 405. The housing 403 is provided also with an annular opening 404 having a removable cover 415, thereby enabling easy access to be had to the torsion adjusting mechanism which will be described in detail hereinafter.

A flange 417 is provided in housing 401 for seating a ball bearing 419 which has its outer race clamped in position by engagement against it of the end of housing 403.

A slot 509 is provided in collar 487 to receive one end 511 of torsion spring 157. Torsion-control collar 507 is provided with ratchet teeth 513 which teeth engage with ratchet teeth 515 on collar 517. A hub 519 is provided on collar 517 that clears torsion spring 157 and rotates on hub 501, a groove 521 being provided in collar 517 to receive end 523 of torsion spring 503.

A hub 525 is provided on collar 507, which hub is recessed to receive shaft 439, the collar 507 being attached to shaft 439 by means of a pin 531, which extends through an opening provided therefor in hub 525.

Spindle 439 fits within the inner race of ball bearing 535 and is extended to fit into bevel gear 539, which is keyed thereto by a key 541.

Housing 405 is substantially right angled and is extended to receive ball bearing 545, a spring retainer and guide 547 being held against the outer race of ball bearing 545 by an annular retaining member 549, which houses a compression spring 60, this spring being held between the spring retainer 547 and flange 34 of guiding sleeve 33 for bit 39, which is mounted in spindle 569 by means similar to those shown in Figs. 1 and 3.

Driven spindle 569 is provided at its other end with a recess for housing spring plug 573 and compression spring 577, the tension of which may be regulated by means of spring plug 579 and set screw 585 threaded into housing 405. Set screw 585 may be locked in any desired position by means of set screw 589. Spindle 569 is preferably provided with an integral collar 595 including simple clutch teeth 599.

Driven bevel gear 561, which meshes with bevel gear 539 normally rotates freely on spindle 569, being held axially by collar 591 and pin 593. Hub 562 of gear 561 is provided with clutch teeth 565 adapted to mesh with teeth 599 on spindle 569 for driving bit 39. The chuck assembly for bit 39 is the same as that shown in Fig. 1.

It is thought that the operation of this form of the device will be apparent from the above description, since the operation is substantially the same as in the previously described modifications, the principal difference in construction being in the right angle adaptation of the clutch with the normally open jaw clutch between the load and the adjustable clutch. Torsion spring 157 is adjusted to a predetermined extent by adjusting the torsion collar 517, the adjustment being held by teeth 515 interlocking with teeth 513 on collar 507. Of course the removable cover 415 is opened to enable access to be had to the collar 517 for effecting the adjustment, the amount of which adjustment determines the amount of torque necessary to be applied to the spindle so that the pins 99 slip out of grooves 499 to relieve the torsion stress on the spindle. The spring 577 pressing upon the shaft 569 normally holds the clutch teeth 599 out of engagement with the teeth 565, so that in order to drive the bit, the sleeve 33 is lowered onto the head of the screw which is to be driven and sufficient pressure must be exerted by the operator to push the sleeve 33 back into the machine against the pressure of spring 60 until the bit 39 engages in the slot in the screw head, and then continuing to press down until the clutch teeth 599 and 565 are caused to engage, thereby operating the bit to cause the screw to be driven home.

From the above description, it will be understood that the present invention is not limited, necessarily, to the precise details of the construction as are herein specifically illustrated and described, but it will be apparent that such details are subject to various modifications which will become apparent readily to one skilled in the art, without departing from the spirit of the invention, and it will be understood, therefore, that it is intended and desired to include within the scope of the invention such modifications and changes as may be necessary to adapt it to varying conditions and uses. It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A rotary tool comprising, in combination, a driving spindle, a driven spindle, torsion-relieving instrumentalities in the driven spindle adapted to break driving connections therebetween and the driving spindle upon application of excessive torsional force to said driven spindle, a torsion spring adapted to act on the said instrumentalities for holding the latter in active position, a rotatable collar mounted on the driven spindle and carrying one end of the said spring, and locking means for the collar, whereby adjustable predetermined torsional force may be applied to the spring and the spring held in adjusted position, the said torsion-relieving instrumentalities being shiftable into inactive position responsively to application to the driven spindle of a torsional force in excess of the adjustment of the spring, thereby stopping operation thereof.

2. A rotary tool comprising, in combination, a driving spindle, a driven spindle, torsion-relieving instrumentalities in the driven spindle adapted to break driving connections therebetween and the driving spindle upon application of excessive torsional force to said driven spindle, a torsion spring adapted to act on the said instrumentalities for holding the latter in active position, a rotatable collar mounted on the driven spindle and carrying the said spring for imparting a predetermined torsional force thereto, and locking means for the collar comprising a fixed collar and interlocking ratchet teeth on the said collars whereby the rotatable collar may be held in adjusted position, the said torsion-relieving instrumentalities being shiftable into inactive position responsively to an application to the driven spindle of a torsional force in excess of the adjustment of the spring, thereby stopping operation thereof.

3. A rotary tool comprising, in combination, a driving spindle, a driven spindle, torsion-relieving instrumentalities in the driven spindle adapted to break driving connections therebetween and the driving spindle upon application of excessive torsional force to said driven spindle, a torsion spring adapted to act on the said instrumentalities for holding the latter in active position, a collar rotatably mounted on the driven spindle and providing a mounting for the said spring for imparting a predetermined torsional force thereto, locking means for the collar for holding the said collar in a predetermined adjusted position, and means operable upon torsional adjustment of the spring for normally holding the said torsion-relieving instrumentalities in operative position while allowing shifting thereof into inactive position responsively to the application to the driven spindle of a torsional force in excess of the adjustment of the spring, thereby stopping operation thereof.

4. A rotary tool comprising, in combination, a driving spindle, a driven spindle, cooperating clutch devices on the driven spindle, clutch pins normally operatively connecting the clutch devices, lever members for actuating the said pins and adapted normally to hold the said pins in operative position for operatively interconnecting the clutch devices, mounting means for the lever members turnably mounted on the driven spindle, and means for operating the said mounting means upon application of torsion for shifting the clutch pins between operative and inoperative positions, the said mounting means enabling the clutch pins to shift into inoperative position responsively to the application of a torque in excess of a predetermined amount to the driven spindle, thereby breaking connections between the clutch devices and rendering the driven spindle inoperative.

5. A rotary tool comprising, in combination, a driving spindle, a driven spindle, cooperating clutch collars on the driven spindle, clutch pins normally operatively connecting the clutch devices, lever members for actuating the said pins and adapted normally to hold the said pins in operative position for operatively interconnecting the clutch devices, mounting means for the lever members turnably mounted on the driven spindle, a torsion spring operatively engaging the mounting means for exerting a predetermined force thereon to retain the clutch pins in operative position, and adjustable locking means for the spring for holding the spring in predetermined position, the said clutch pins being adapted to be shifted into inoperative position against the action of the lever members upon impressment of a torsional force on the driven spindle in excess of the force on the said clutch pins by the said torsion spring, thereby rendering the driven spindle inactive upon application of such force.

6. A clutch drive assembly comprising, in combination, a pair of coaxial spindles, clutch pins normally forming an operative connection between said spindles, a coil spring concentric with one of said spindles and adapted to apply torque to said clutch pins for holding the same in operative position, and means whereby a torque in opposition to and in excess of the torque of said spring will cause said clutch pins to shift to inoperative position and so break the connection between said spindles.

7. A clutch drive assembly comprising, in combination, a driving spindle, a driven spindle coaxial therewith, clutch pins normally forming an operative connection between said spindles, bell crank lever means bearing upon said clutch pins, a coil spring concentric with said driven spindle and adapted to apply torque to said lever means for holding said clutch pins in operative position, means for adjusting said spring to exert a predetermined degree of torque, and means whereby a torque applied to said driven spindle in excess of said predetermined degree will cause said clutch pins to overcome the opposition of said spring and shift to inoperative position.

8. A clutch drive assembly comprising, in combination, a pair of coaxial spindles, clutch pin means normally forming an operative connection between said spindles, means for applying torque to said clutch pin means for holding the same in operative position, and means whereby torque applied in opposition to and in excess of said first-named torque will cause said clutch pin means to shift to inoperative position and so break the connection between said spindles.

9. A clutch drive assembly comprising, in combination, a pair of coaxial spindles, clutch pins normally forming an operative connection between said spindles, means for applying a predetermined degree of torque to said clutch pins for holding the same in operative position, and means whereby a torque applied in opposition to and in excess of said predetermined degree will cause said clutch pins to shift to inoperative position and so break the connection between said spindles.

WHITFIELD MORETTI.

CERTIFICATE OF CORRECTION.

Patent No. 2,184,394.　　　　　　　　　　　　　December 26, 1939.

WHITFIELD MORETTI.

It is hereby certified that error appears in the printed specification of the above numbered patent requiring correction as follows: Page 4, first column, line 50, after "housing 403." insert the following paragraphs -

> The drive shaft assembly is substantially the same as that shown in Fig. 3, comprising driving shaft 367, gear 371, and collar 365 with its annular extension 381 and chambered recess 377.
>
> The drive shaft 439 is extended to the right of its enlarged portion as viewed in Fig. 8, extending through gear 539, grooves 451 and 453 being provided in the enlarged section of the shaft 439, the grooves 451 and 453 bounded by rib 454, and forming flanges 455 and 457, the flange 455 being slotted as indicated at 459 while slots 463 are provided in flange 457. The slots 459 and 463 form a guide for the ends of clutch pins 99.
>
> Also, flanges 455 and 457 are provided with holes, not shown, for receiving and supporting the pawl-fulcrum pins 91. Fulcrum pins 91 have pawls 75 mounted upon them, arms 177 thereof engaging slots 485 and 491. Arms 195 of pawls 75 support clutch pins 99 as described hereinafter. The annular extension 497 of collar 487 is provided also with the internal slots 485 and 491 into which project the pawl extensions 177, as has been mentioned above, the collar 487 being provided additionally with a hub 501 arranged to clear the torsion spring 157 and to rotate on shaft 439.

and that the said Letters Patent should be read with this correction therein that the same may conform to the record of the case in the Patent Office.

Signed and sealed this 6th day of February, A. D. 1940.

(Seal)　　　　　　　　　　　　　　　　　　Henry Van Arsdale,
　　　　　　　　　　　　　　　　　　　　Acting Commissioner of Patents.